US005740345A

United States Patent [19]
Danielson et al.

[11] Patent Number: 5,740,345
[45] Date of Patent: Apr. 14, 1998

[54] METHOD AND APPARATUS FOR DISPLAYING COMPUTER GRAPHICS DATA STORED IN A COMPRESSED FORMAT WITH AN EFFICIENT COLOR INDEXING SYSTEM

[75] Inventors: Brian H. Danielson, Tomball; John J. Watters, Spring; Timothy J. McDonald, Houston, all of Tex.

[73] Assignee: Compaq Computer Corporation, Houston, Tex.

[21] Appl. No.: 411,453

[22] Filed: Mar. 28, 1995

[51] Int. Cl.⁶ .................................................. G06T 11/00
[52] U.S. Cl. .................................................. 395/131
[58] Field of Search ........................... 395/131, 130, 395/132, 126; 358/523, 524, 525

[56] References Cited

U.S. PATENT DOCUMENTS 4,847,677  7/1989  Music et al. ........................ 382/245 X Primary Examiner—Almis R. Jankus
Attorney, Agent, or Firm—Vinson & Elkins L.L.P.

[57] ABSTRACT

A graphics controller for use in a computer system stores information from the screen memory portion of its frame buffer in a compressed form, either in a separate compressed data memory or a portion of the frame memory separate from the screen memory. Data in the compressed data memory references color data in a color dictionary. The display controller uses the color data from the compressed data memory to drive the display, thereby reducing accesses to the frame buffer by the display controller. Accordingly, other devices, such as hardware accelerators, have greater opportunities to access the frame buffer.

22 Claims, 5 Drawing Sheets

METHOD AND APPARATUS FOR DISPLAYING COMPUTER GRAPHICS DATA STORED IN A COMPRESSED FORMAT WITH AN EFFICIENT COLOR INDEXING SYSTEM

TECHNICAL FIELD OF THE INVENTION

This invention relates in general to computer graphics controllers and, more particularly, to a computer graphics controller using compression to store frame buffer data.

BACKGROUND OF THE INVENTION

The speed at which a personal computer operates is dependent upon a number of factors. Naturally, the speed of the microprocessor has a significant influence on the operational speed of the overall computer system. Next to processor speed, in many cases, the graphics subsystem has the most influence on the performance of the overall computer system. This is particularly true when a graphical user interface, such as MICROSOFT WINDOWS (by Microsoft Corporation of Redmond, Wash.) is used. In order to boost performance, most modern-day personal computers use a local video bus (which has a higher data bandwidth than the main peripheral bus) and an accelerated graphics controller which increases the speed of certain operations. An accelerated graphics controller allows the graphics controller to perform selected operations at high speed, rather than using the CPU (central processing unit) to perform the operation. Hardware acceleration improves the operation of the computer system in two ways: (1) the CPU no longer needs to perform low-level operations handled by the graphics controller and (2) the data bandwidth for certain operations is greatly reduced, resulting in less bus traffic.

Most graphics controllers make use of a frame buffer which is a large memory bank dedicated to holding the pixel information for the display. Each pixel location on the display has a corresponding memory location in the frame buffer. The size of the memory location depends upon the color depth of the display. For example, using a color depth of 16.7 million colors requires twenty-four bits of information to be allocated for each pixel position. Smaller color depths, such as a 256 color depth, uses a color palette in which the color information for up to 256 colors is stored in the memory comprising the palette and each pixel in the display is referenced to a location in the palette. The size of the frame buffer depends not only upon the highest color depth supported, but also the number of pixels to be displayed. Hence, for a screen resolution of 1260×1024 pixels at a twenty-four bit color depth, requires a frame buffer the size of four megabytes. Currently, typical consumer graphics controllers have a one megabyte to two megabyte frame buffer while commercial graphics controllers may have four megabytes or greater.

During the operation of a graphics controller, the frame buffer is accessed by a number of devices. Most importantly, a display controller reads a predetermined number of bits from the frame buffer per memory access (typically from 32–128 bits), serializes the information and sends the serial data to the DAC (digital-to-analog converter). However, there may be other requesters which also need access to the DAC, particularly on accelerated graphics controllers. These requesters include the BLT (block transfer) engine, line engine and polygon engine which perform dedicated hardware acceleration of certain drawing functions. Further, the frame buffer, which typically comprises DRAM, must be refreshed at regular intervals. The host processor (the system microprocessor) may also access the frame buffer, as will video chips (such as MPEG (Motion Picture Entertainment Group) devices), if present.

Accordingly, the frame buffer can present a bottleneck to the system and it is desirable that the frame buffer respond to requests as quickly as possible. One way of improving the speed of the frame buffer is to use VRAMs (video random access memories) which comprise a bank of DRAMs (dynamic random access memories), along with a shift register at the output. VRAMs allow display information to be queued in the shift register while other operations on the DRAM, such as DRAM refresh, are being performed.

VRAM, however, is significantly more expensive than DRAM. Therefore, it is desirable to use DRAM in certain classes of graphics controllers. However, current uses of DRAM on a graphics controller significantly affect the speed at which the graphics controller operates.

Therefore, a need has arisen in the industry for a graphics controller which may use DRAM without sacrificing speed.

SUMMARY OF THE INVENTION

The present invention provides a graphics controller having a screen memory for storing color information to be displayed on a display, a color dictionary for storing color information on a plurality of colors and a compressed data memory for storing data from the screen memory in a compressed form. A controller defines colors in the color dictionary, stores data from the screen memory in the compressed data memory in a compressed form and accesses data in compressed form from the compressed data memory and decompresses the data for display.

The present invention provides significant advantages over the prior art. First, the use of compressed data to service the display reduces accesses to the frame buffer of the graphics controller by the display controller allowing greater access by other devices such as a line draw engine, BLT engine or host processor. Second, the increased efficiency of the controller allows the use of less expensive DRAM devices to implement the frame buffer, instead of VRAM devices.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
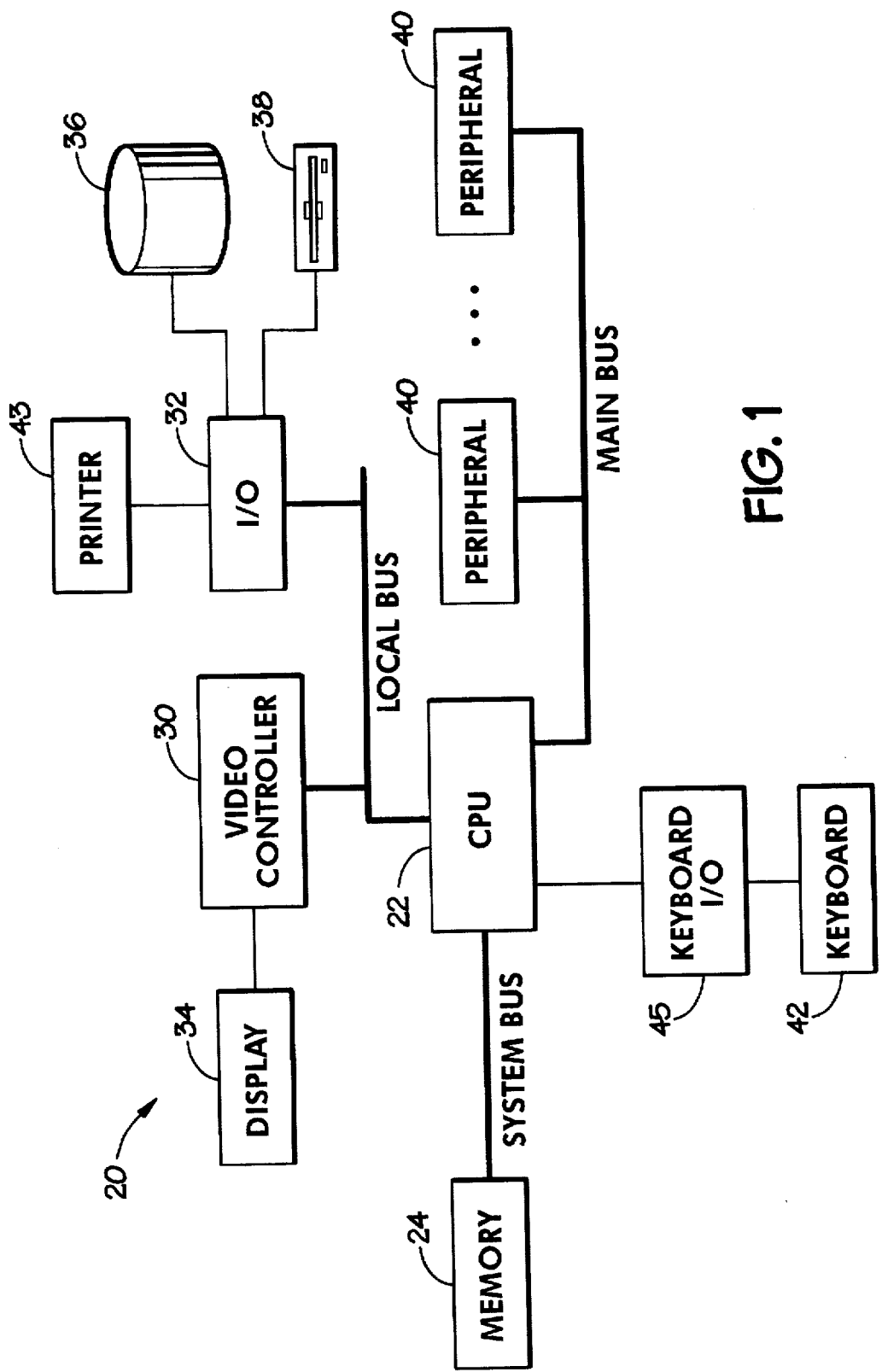
FIG. 1 illustrates a computer system.

FIG. 1 illustrates a block diagram of a computer system 20. The computer system 20 includes a microprocessor (or central processing unit) 22, coupled to memory 24, a local bus 26 and a main peripheral bus 28. A graphics controller 30 and I/O circuitry 32 are coupled to the local bus 26. A display 34 (such as a CRT monitor or an LCD flat panel) is coupled to the graphics controller 30. A hard disk 36 and floppy disk 38 are coupled to the I/O circuitry 32. A plurality of peripherals 40 are coupled to the main bus 28. A keyboard 42 is coupled to the CPU 22 through keyboard interface 45. A printer 43 is also coupled to I/O circuitry 32. The computer system 20 of FIG. 1 is an exemplary embodiment for a high performance computer system. Many computer systems vary from the architecture shown in FIG. 1, and the invention described herein would apply to various architectures. Further, the architecture shown in FIG. 1 is a basic architecture and many of the details have been removed for illustrative purposes.

Figure 2:
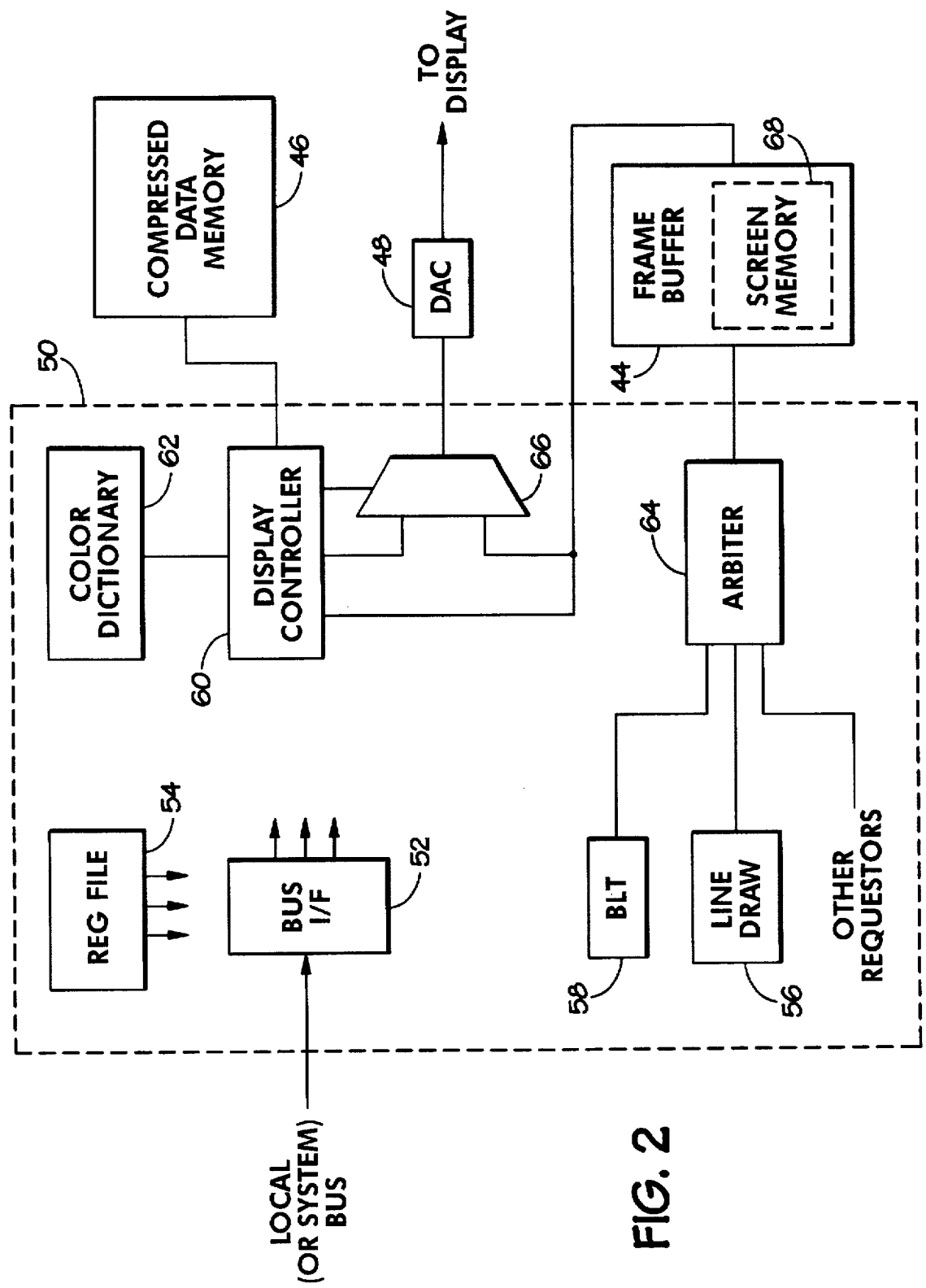
FIG. 2 illustrates a graphics controller used in the computer system of FIG. 1.

FIG. 2 illustrates a more detailed block diagram of the graphics controller 30. The graphics controller 30 includes a frame buffer 44, an compressed data memory 46, a digital to analog converter (DAC) 48 and logic 50 including, in part, an interface 52 for communicating with the bus 26, a register file 54 comprising a plurality of registers (or other memory) for storing control information for operation of the graphics controller 30, a plurality of hardware accelerator circuits, such as a line draw engine 56 and bit block transfer (BLT) engine 58, a display controller 60 and an color dictionary 62. Arbiter 64 controls access to the frame buffer 44 by the controller, the hardware accelerator circuits, and other devices which may access the frame buffer 44, such as the host processor, video devices, and so on. Multiplexer 66 is coupled to the frame buffer 44 and the display controller 60 to output data to the DAC 48. The register file 54 and bus interface 52 are coupled to various components in the logic 50. Other control structure for coordinating operation of the various components of the graphics controller is not shown, as such would be known to one skilled in the art.

The frame buffer 44 is shown with a screen memory region 68. The screen memory 68 is that portion of the frame buffer which holds data to be displayed. The size of the screen memory 68 will change depending upon the number of colors supported (the "color depth") and the screen resolutions (the number of pixels shown on the display). The compressed data memory 46 stores some or all of the information from the screen memory 68 in compressed form, typically by run length encoding (RLE) compression or similar methods. For purposes of this specification, "run length encoding" will include all methods by which data is compressed by denoting a color index and the number of consecutive pixels associated with that color index. The compressed data memory 46 may be part of the frame buffer 44 not needed for screen memory, or may be a separately addressible memory. A separately addressible memory decreases accesses to the frame buffer, but increases the complexity of the design.

In operation, the color dictionary 62 contains information on a plurality of colors, which may be selected according to a number of schemes, several of which are discussed hereinbelow. The purpose of the compressed data memory 46 is to provide a memory from which the display controller 60 can access compressed data to be output to the DAC 48 in order to reduce the accesses to the frame buffer 44. Because the data is compressed, the compressed data memory 46 may be significantly smaller than the screen memory 68. Because, in many instances, the display controller can access the compressed data memory 46 instead of the screen memory 68, the requesters such as the BLT engine 58 and line draw engine 56 have a greater opportunity to access the screen memory 68, thus increasing the efficiency of the system. Even if the compressed data memory 46 is part of the frame buffer 44, the compressed nature of the information in the compressed data memory 46 reduces the number of accesses of the frame buffer by the display controller 60. A primary benefit of the preferred embodiment is that less expensive DRAM can be used in place of VRAM (video random access memory) to implement the frame buffer 44, which is typically between 1 megabyte and 4 megabytes in size, and is therefore one of the most expensive portions of the graphics controller 30.

The purpose of the color dictionary 62 is to store a group of colors to which the compressed data memory 46 can refer to by reference to an index of the color dictionary 62. For example, if the color in location "0000" (binary) of the color dictionary 62 is white (RGB=<255,255,255>), the color can be stored in the compressed data memory 46 as "0000" (binary), followed by the number of consecutive white pixels. Consequently, in an exemplary embodiment, if white is a color in the color dictionary, a run of one hundred white pixels could be stored as a four-bit color reference to the color dictionary 62 followed by an eight bit length representation, rather than by one hundred 24-bit values.

It is assumed that the color dictionary 62 stores a relatively small number of colors, such as sixteen, since the display controller will have to determine whether a color of a pixel is in the color dictionary 62 as the frame buffer is updated. Consequently, the color of each pixel must be matched to the color dictionary 62 at high speed. The color dictionary, therefore, uses comparators to match the stored colors to the colors output to the frame buffer 44 and outputs a signal which can be detected by the display controller when a match occurs.

Several embodiments for maintaining the color dictionary 62 and storing information in the compressed data memory 46 are set forth below. The display controller can control the compression and decompression of data to and from the compressed data memory 46, or the compression and decompression can be handled by separate logic.

Figure 3A:
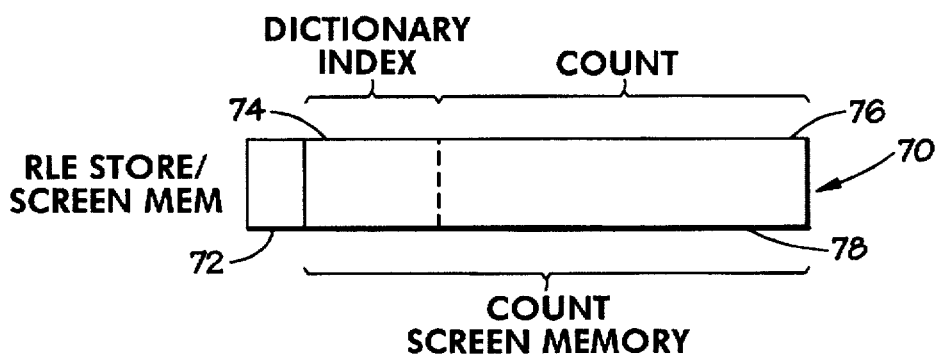
FIG. 3a–3d illustrate data structures for storing compressed data from the screen memory in the compressed data memory.

In a first embodiment, data is stored in the compressed data memory 46 as shown in FIG. 3a. In this embodiment, the compressed data memory 46 is arranged on a scan line (or partial scan line) basis as a plurality of fixed bit units 70, for example, 12-bit units. One bit is a RLE_Store/Screen_ Mem control bit 72 which indicates whether the remaining bits of the unit 70 relate to a color stored in the color dictionary 62 or to a color which must be obtained from the screen memory 68. If the control bit 72 indicates that the color can be obtained from the color dictionary 62, then a second field, the dictionary index field 74, indicates the index of the color in the color dictionary 62. For example, with a color dictionary 62 storing eight colors, the index field 74 would be three bits wide. The remaining eight bits form a count field 76 which indicates the number of consecutive pixels for the scan line or partial scan line which use the indexed color.

If the control bit 72 indicates that the color must be obtained from the screen memory 68, the remaining bits of the unit 70 form an 11-bit count field which indicates the consecutive pixels for the scan line which must be obtained from the screen memory 68.

In the preferred embodiment, each scan line has associated units in the compressed data memory 46. Hence, for a 1024×768 display, there would be 768 scan lines, each of 1024 pixels. The compressed data memory 46 would be configured as 768 groups of units 70. When color information from a scan line exceeds the amount of units attributed to the scan line, the color information is taken from the screen memory 68.

This technique minimizes the size of the compressed data memory 46, but results in a higher proportion of screen memory accesses than the techniques described hereinbelow. To further minimize the size of the compressed data memory 46, references to the color dictionary 62 could be made only if a threshold number of consecutive pixels was exceeded.

As would be obvious to one skilled in the art, the number of bits in the dictionary and count fields would depend upon the number of colors supported by the color dictionary and the desired maximum count.

Figure 3B:
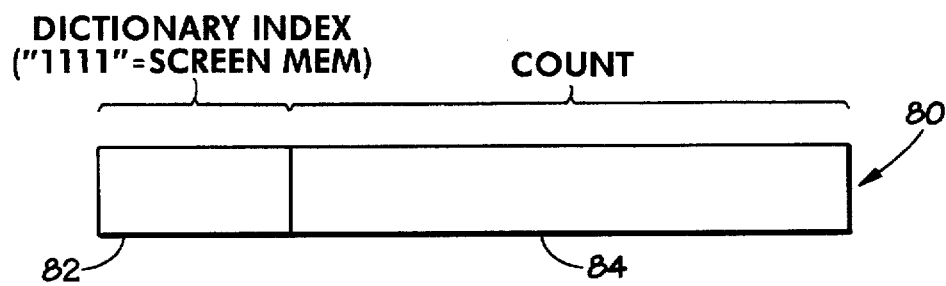

A second technique for arranging the compressed data memory 46 is shown in FIG. 3b. In this embodiment, the units 80 are formed of a diction index field 82 and a count field 84. In an exemplary embodiment, the index field 82 is four bits wide and the count field 84 is twelve bits wide. In this embodiment, the index field 82 can reference one of fifteen colors with one index entry (e.g., "1111" (binary)) indicating that the color information must be obtained from the screen memory 68. The count field indicates the consecutive pixels for the scan line, or partial scan line, having the identical color. As opposed to the embodiment of FIG. 3a, even if the index field 82 references the screen memory 68, the index field indicates the consecutive pixels having the same color. Thus, if three consecutive pixels have different colors, and none of the colors is in the color dictionary 62, then each pixel would have a corresponding unit in the compressed data memory 46. If three consecutive pixels have the same color, and the color is not in the color dictionary 62, then one unit 80 could provide the information for all three pixels.

This technique uses a larger compressed data memory 46 for efficient operation, but reduces accesses to the screen memory 68 because runs of non-indexed colors can be defined in a single unit 80.

Figure 3C:
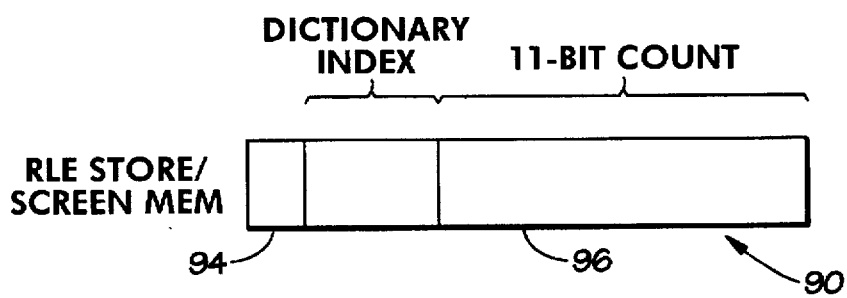
Figure 3D:
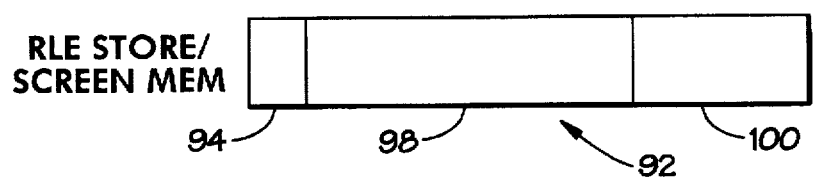

A third technique for storing information in the compressed data memory 46 is shown in FIGS. 3c and 3d. This technique uses a first unit type 90 (FIG. 3c) for references to the color dictionary 62 and second unit type 92 (FIG. 3d) used in connection with references to the screen memory 68. The unit type is identified by the value of the first bit of either unit 90 or 92, the RLE_Store/Screen_Mem control bit 94. If this bit is set to a predetermined value such as "0", the remaining bits of the unit are defined as a color dictionary unit 90; if the bit is set to a "1" the remaining bits of the unit are defined as a screen memory unit 92.

The color dictionary unit 90 includes, in addition to the RLE_Store/Screen_Mem control bit 94, a dictionary index field 96 which points to a color in the color dictionary 62 and a count field which indicates the number of consecutive pixels which are of the identical color. The screen memory unit 92 includes, in addition to the RLE_Store/Screen_Mem control bit 94, a count field 98 and a color reference field 100. The color reference field 100 provides the actual color information for the pixel; for example, for a 24-bit color depth, the color field 100 would be twenty four bits wide. Because the actual color data is stored in the compressed data memory 46, the screen memory 68 does not need to be accessed in order to obtain the color information. The count field 98 indicates the number of consecutive pixels using the referenced color information.

In order to maintain the compressed data memory 46 to reflect the data in the screen memory 68, the display controller 60 must monitor the arbiter 64 to determine whether new information is written to the screen memory 68. As information is written to the screen memory 68, the corresponding scan lines of the compressed data memory 46 are updated.

For the above described techniques, the color memory can be updated in a variety of ways. The ideal way would be to monitor all the pixels in the screen memory to determine which colors were the most popular. However, this would be very hardware intensive.

A more practical technique is to determine likely colors from the operating system or the host software. Operating systems, such as MICROSOFT WINDOWS from Microsoft Corporation of Redmond, Wash., allow a host application to specify certain colors through a "Realize_Object(Style)" primitive. The color set by the host application can be communicated to the graphics controller through the driver software for use with accelerated graphics functions such as accelerated circle, rectangle, polygon and other functions (the driver software is the bridge between the operating environment and the graphics card). By monitoring calls using the Realize_Object and accelerated functions, a determination of the most likely colors to dominate the screen can be made. Further, WINDOWS sets colors for certain aspects of the interface, known as the "desktop", though a configuration program called "Control Panel"; the colors set in Control Panel are also likely candidates for popular colors on the display.

Other graphical interface operating systems use similar mechanisms to set colors and interface with application programs. The colors set in Realize_Object and Control Panel can be sent to the graphics controller 30 by driver software (which communicates information between the operating environment and the controller) and used to set the colors in the color dictionary 62. Alternatively, the host program could communicate information to set the colors in the color dictionary 62 of the controller 30.

Figure 4:
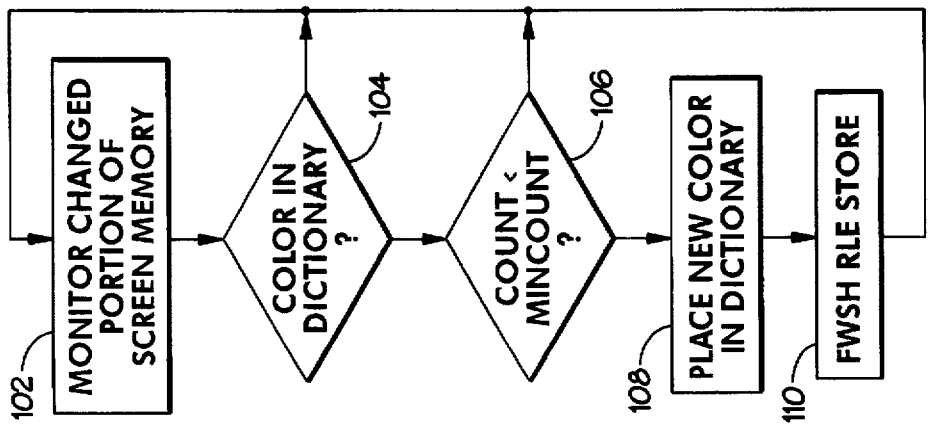
FIG. 4 illustrates a flow chad describing steps for one method of updating the color dictionary of the graphics controller of FIG. 2.

A second technique is to use the colors which are associated with the longest runs in the screen memory 68. This technique is demonstrated in connection with FIG. 4. As the screen memory locations are updated through the arbiter 64, the lengths of runs of pixels having the same color is monitored in block 102. If a color is not in the color dictionary in block 104, then the length of its run is compared to the dictionary entry with the shortest length (Mincount) in decision block 106. If the color has a longer run, that color replaces the color with the shortest run in the color dictionary 62 in block 108. When the color dictionary 68 is modified, the compressed data memory 46 must be updated since some units may refer to the replaced color. In the preferred embodiment, the compressed data memory 46 is flushed and rebuilt from the output of the screen memory.

If the new color is already in the dictionary 62 in decision block 104 or if the length of the run is not greater than the length of the shortest run in the color dictionary 62, then the color of the next pixel is compared and blocks 104–110 are repeated.

Figure 7:
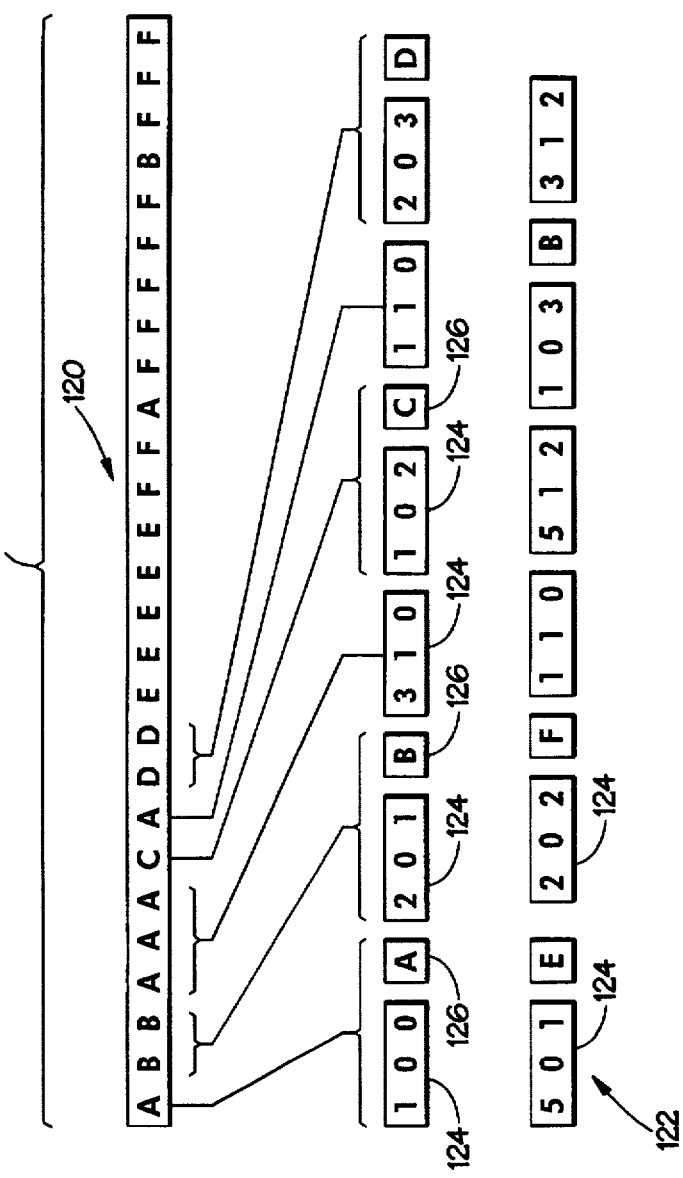
FIG. 7 illustrates compression of an exemplary pixel data stream.
Figures 5, 6:
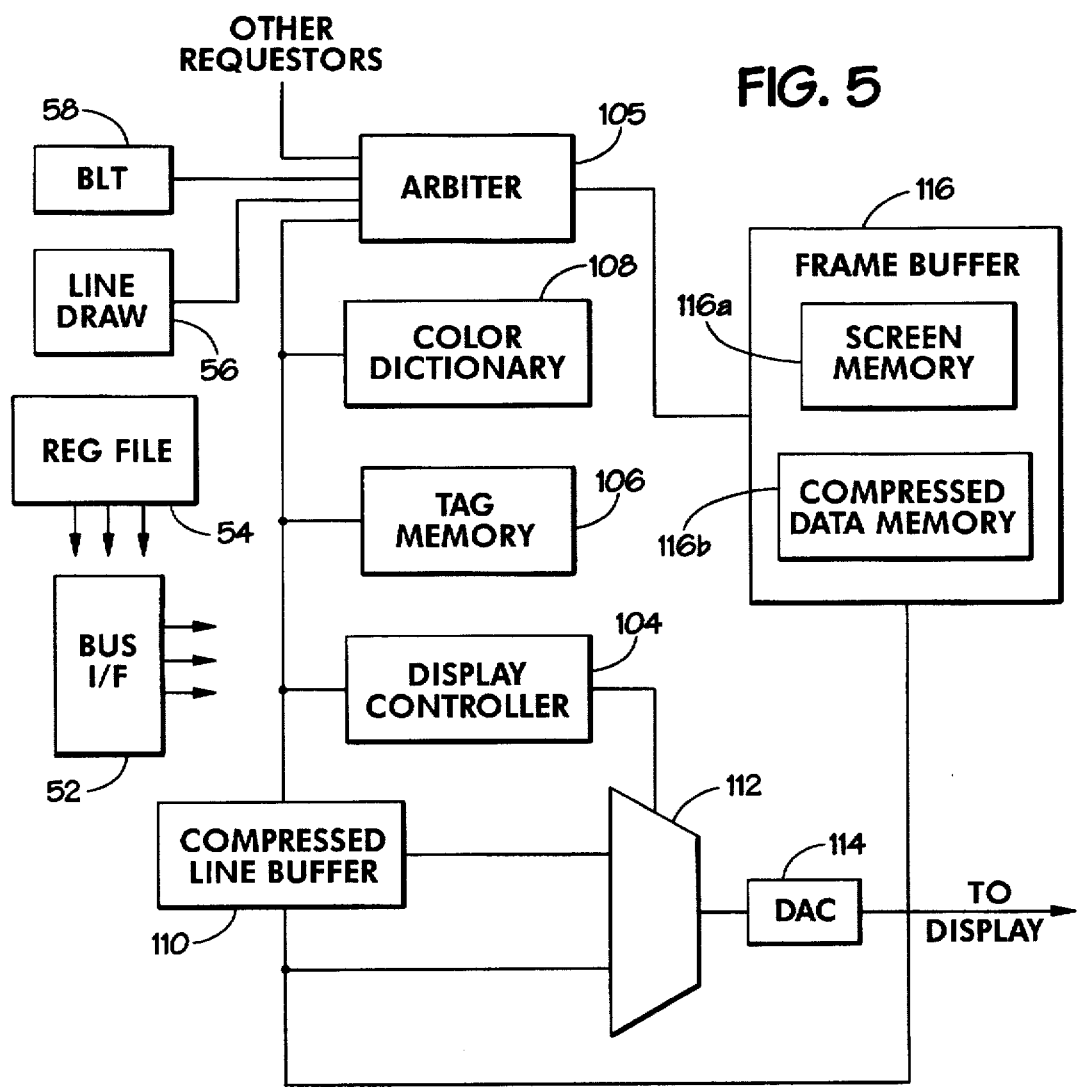
FIG. 5 illustrates a second embodiment of the present invention.
FIG. 6 illustrates a tag memory structure used in the graphics controller of FIG. 5.

Another embodiment of the invention is illustrated in FIGS. 5–7. This embodiment uses a slightly different architecture, as shown in pertinent part in FIG. 5. In this embodiment, a display controller 104 is coupled to arbiter 105, tag memory 106, a color dictionary 108 and a compressed line buffer 110. The compressed line buffer 110 is coupled to an input of multiplexer 112. Multiplexer 112 has an output connected to a DAC 114. The frame buffer 116, which has a portion of its memory defined as screen memory 116a and a portion of its memory defined as compressed data memory 116b is coupled to the arbiter 105 and to the input of multiplexer 112. The remainder of the graphics controller 30 is substantially as shown in FIG. 2.

In operation, the tag memory 106 has two bits (or "flags") assigned to corresponding sections of the screen memory as shown in FIG. 6. In FIG. 6, the sections are defined as scan lines; hence, for a 1024×768 display, the tag memory 106 would have 768 two-bit entries, each entry referring to a 1024 pixel scan line. The tag memory 106 could have a greater or lesser number of entries by dividing the screen memory into smaller or larger sections, respectively. For example, compression may be more efficient if each section was associated with a half-line or a quarter line. For purposes of illustration, it will be assumed that each section is associated with a scan line.

The first flag, the compressed flag 106a, indicates whether the corresponding section is compressed. The second flag, the dirty flag 106b, indicates whether the corresponding section has been written to since compression. As will become clearer, if the section is not compressed, the corresponding dirty flag 106b is irrelevant.

Initially, the tag memory 106 contains all zeros. The display controller cycles through each section (or in the present example, through each line), and checks the corresponding bits of the tag memory 106. If the line is compressed, and is not dirty, the compression data buffer 110 is filled from the compressed memory 116a of the frame buffer 116, where it is decompressed and output to the DAC 114.

If the line is not compressed or is dirty, the display data is fetched from the screen memory 116a and output on the DAC 114 and to the compressed line buffer. The dirty flag 106b for this section is cleared at this time. The display controller determines whether the line can be compressed to a sufficient degree. If the line can be compressed to a suitable degree, and if the dirty flag 106b has not been set since the data was received from the screen memory, the compressed data is stored in the compressed data memory 116b and the compressed flag 106a and the dirty flag 106b of the tag memory 106 are cleared for that line.

The display controller 104 monitors the arbiter 105 to detect all write accesses to the screen memory 116a. If a write to the screen memory 116b occurs, the display controller 104 sets the dirty flag 106b of the affected line (or portion thereof).

The compressed data memory 116a can be organized into byte units described below:

Control Code Unit (8 bits)

bits 0–1: dictionary entry (0–3)

bit 2: change dictionary bits 3–7: length of run of consecutive pixels of same color If a control code unit indicates that a change dictionary has occurred, it is followed by the color information for the new color. Hence, if a 24-bit color depth is used, the control code unit will be followed by a 24-bit color information unit.

For each line, the color dictionary 108 is cleared and initialized with the first four distinct colors of the line. Thereafter, if a color is in the color dictionary 108, a single control code unit may be used to define a run of consecutive pixels of the line having the identical color. For the control code unit described above, a run of up to thirty two identical pixels can be defined by a single control code unit. If a pixel has a color which is not in the dictionary, then the least recently used color from the dictionary is replaced with the new color (bit 2 indicates that a new dictionary entry is being made) and the color information is entered into the compressed data stream. Thus, while the color dictionary holds four colors at any one time, throughout a line of data, the colors held in the table may change without the need to update the compressed data memory 116b, since the color information for each color dictionary entry is embedded within the compressed data.

It should be noted that while the control code unit described above supports runs having a length of thirty-two pixels and a four color dictionary, a greater run length or a larger color dictionary could also be supported.

FIG. 7 illustrates a partial line of pixel information 120, using A–F to denote colors, and the resulting compressed data 122. The first pixel has color A, so color A is entered into the dictionary with index "0" and the control code unit 124 (indicating run length, whether the dictionary was changed, and the index) is followed by the color information unit 126. For example, if "A" was white in a 24-bit color depth, the control code unit would be followed by the binary representation of <255,255,255>. The second and third pixels have color "B"; therefore color B is entered into the dictionary 108 and the control code for the second and third pixels are followed by the color information for color "B". The fourth through sixth pixels are of color "A", which is already in the dictionary, therefore a control code unit can define the run of three colors by reference to the dictionary, without adding the color information to the compressed data stream. The seventh pixel has color "C", this color is added to the color dictionary at index "2" and the color information follows the control code unit. The eighth pixel has color "A", which is already in the color dictionary 108. The ninth and tenth pixels have color "D"; this color is added to the color dictionary at index "3", and the color information added to the compressed data stream after the control code unit for the ninth and tenth pixels.

At this point the color dictionary 108 is full. When the eleventh pixel (color "E") is a pixel which is not in the color dictionary 108, the least recently used color is replaced. In the example, color "B" (index "1") has been used least recently, and is replaced by color "E". The color information is added to the stream of compressed data. Likewise, since color "F" is not in the dictionary, it replaces the least recently used color, color "C" (index "2"). When color "B" is used again at the twenty fourth pixel, it replaces color "D".

In an alternative embodiment to that shown in FIG. 7, upon replacing a color in the color dictionary 108, the length of the run for the new color is not maintained in the control code unit; instead, the run length will be set forth in the control code unit for the next occurrence of that color, if such occurrence happens while the color remains in the color dictionary. The run length field of the control code unit can be used for other control information relating to the replacement of a color in the color dictionary.

Assuming 24-bit data was used, the uncompressed data would require 27×3=81 bytes. Using the compression described herein, the data requires only (12 control code units×1 byte)+(7 color information units×3 bytes)=33 bytes.

During decompression, the color dictionary is updated each time a control code unit indicates a dictionary change. Hence, the dictionary is updated during decompression such that all control code units get current color information from the color dictionary.

Additional measures can be used to increase the compression ratio. In addition to detecting runs of pixels with the same color, repeating patterns could also be detected and compressed. This is particularly effective where dithered colors are used where colors are generated using patterns of pixels of two or more colors. In WINDOWS the patterns are 8×8 or 16×16 patterns, although other patterns could be provided for; hence, by detecting repetitions of n bit patterns (since the display controller is looking at one line at a time), additional compression can be achieved.

In one embodiment, an initial pattern for a predetermined number of pixels is loaded into a register, and subsequent pixels of the line are compared to this pattern determine whether the pattern is repeating. Thus, for an initial pattern of eight pixels, the ninth pixel of the line is compared to the first pixel of the initial pattern, the tenth pixel of the line is compared to the second pixel of the initial pattern and so on. Once a pixel indicates that the pattern is not repeating, the initial pattern is updated to include the pixels up to the point of the mismatch, and the comparison continues at the first pixel of the pattern. Thus, if the tenth pixel of the line does not match the second pixel of the pattern, then the pattern is modified to include the first ten pixels of the line, and the comparison continues with the eleventh pixel being compared with the first pixel of the pattern. The compressed data memory can combine control units indicating runs of consecutive pixel colors and runs of patterns for maximum efficiency.

Further, other methods of choosing which color of the color dictionary 108 to replace could be implemented, such as choosing the color which had been used the least, rather than the least recently used.

It is assumed herein that the display controller 104 contains the compression and decompression logic, although such logic could be provided by a separate circuit which operates in conjunction with the display controller 104. Further, it is assumed that the color dictionary 108, tag memory 106, display controller 104, and compressed line buffer 110 are part of a logic chip, typically formed as an ASIC (application specific integrated circuit) although it would be possible to provide the functions as separate circuits.

This embodiment of the present invention provides significant advantages. The compression provides for compressed color data with a relatively small color dictionary. Since the colors maintained in the color dictionary may change during compression of a section, the size of the color dictionary does not limit the colors which can be used in compression of the color data.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

What is claimed is:

1. A method of generating data for output to a computer display comprising a plurality of pixels, comprising the steps of:
    for each pixel of the display, storing color information in a respective location in a screen memory;
    storing selected color information for a predetermined number of colors in a color dictionary, each color associated with an index, wherein said selected color information is responsive to data received from driver software;
    storing color information corresponding to all or a portion of the pixels of the display in a compressed data memory wherein a run of one or more pixels of the same color are represented by reference to one of said indices and a count of the number of pixels in the run;
    accessing color information from said compressed data memory to output to said display.

2. The method of claim 1 wherein said selecting step comprises selecting colors responsive to the colors in the screen memory having runs of the greatest length.

3. The method of claim 1 wherein said selecting step comprises selecting the most recently used colors in a predefined section of said screen memory.

4. The method of claim 3 wherein the step of selecting the most recently used colors comprises the steps of:
    identifying a first color being written to the predefined section of said screen memory;
    determining whether the first color is one of the colors for which color information is stored in the color dictionary;
    if the color is not one of the colors for which color information is stored in the color dictionary, replacing color information for a second color with color information for said first color in said dictionary, said second color being one of the colors for which color information is stored in the color dictionary.

5. The method of claim 4 wherein said step of replacing color information comprises the step of replacing color information for a second color with color information for said first color in said dictionary, said second color being a color for which color information is stored in the color dictionary and was least recently written to the screen memory in relation to the other colors of the color dictionary.

6. The method of claim 1 wherein said step of storing color information in the compressed data memory includes the steps of:
    storing a count of the number of pixels in a run;
    storing control information indicating one of the color dictionary or the screen memory as the source of the color information.

7. The method of claim 6 wherein the count indicates a number of consecutive pixels of the same color.

8. The method of claim 6 wherein the count indicates a number of consecutive pixels for which color information must be obtained from the screen memory, if said control information indicates that the screen memory is the source of the color information.

9. The method of claim 1 wherein said step of storing color information in the compressed data memory comprises the steps of:
    if the color information is currently stored in the color dictionary, storing count of the number of pixels in a run and an index to the color dictionary; and
    if the color information is not currently stored in the color dictionary, storing the RGB color information in the compressed data memory.

10. The method of claim 9 and further comprising storing a count of the number of pixels in a run if the color information is not currently stored in the color dictionary.

11. Circuitry for generating data for output to a computer display comprising a plurality of pixels, comprising:
    a screen memory for storing each pixel of the display in a respective location in the screen memory;
    a color dictionary coupled to said screen memory for storing selected color information for a predetermined number of colors, each color associated with an index, wherein said color information in said color dictionary is responsive to data received from driver software;
    a compressed data memory for storing color information corresponding to all or a portion of the pixels of the display wherein a run of one or more pixels of the same color are represented by reference to one of said indices and a count of the number of pixels in the run;

a display controller for accessing color information from said compressed data memory to output to said display.

12. The circuitry of claim 11 wherein said color information in said color dictionary is responsive to the colors in the screen memory having runs of the greatest length.

13. The circuitry of claim 11 wherein said color information in said color dictionary is responsive to the most recently used colors in a predefined section of said screen memory.

14. The circuitry of claim 11 wherein said color information in the compressed data memory includes a count of the number of pixels in a run and control information indicating one of the color dictionary or the screen memory as the source of the color information.

15. The circuitry of claim 14 wherein the count indicates a number of consecutive pixels of the same color.

16. The circuitry of claim 14 wherein the count indicates a number of consecutive pixels for which color information must be obtained from the screen memory, if said control information indicates that the screen memory is the source of the color information.

17. A system for displaying computer graphics, comprising:

a computer display comprising a plurality of pixels; and circuitry for generating data for output to the computer display, comprising:

a screen memory for storing each pixel of the display in a respective location in the screen memory;

a color dictionary coupled to said screen memory for storing selected color information for a predetermined number of colors, each color associated with an index, and wherein said color information in said color dictionary is responsive to data received from driver software;

a compressed data memory for storing color information corresponding to all or a portion of the pixels of the display wherein a run of one or more pixels of the same color are represented by reference to one of said indices and a count of the number of pixels in the run;

a display controller for accessing color information from said compressed data memory to output to said display.

18. The circuitry of claim 17 wherein said color information in said color dictionary is responsive to the colors in the screen memory having runs of the greatest length.

19. The circuitry of claim 17 wherein said color information in said color dictionary comprises the most recently used colors in a predefined section of said screen memory.

20. The circuitry of claim 17 wherein said color information in the compressed data memory includes a count of the number of pixels in a run and control information indicating one of the color dictionary or the screen memory as the source of the color information.

21. The circuitry of claim 20 wherein the count indicates a number of consecutive pixels of the same color.

22. The circuitry of claim 20 wherein the count indicates a number of consecutive pixels for which color information must be obtained from the screen memory, if said control information indicates that the screen memory is the source of the color information.

* * * * *